Sept. 5, 1967  F. K. FOX  3,339,380
SHOCK ABSORBER
Filed Sept. 16, 1965  4 Sheets-Sheet 1
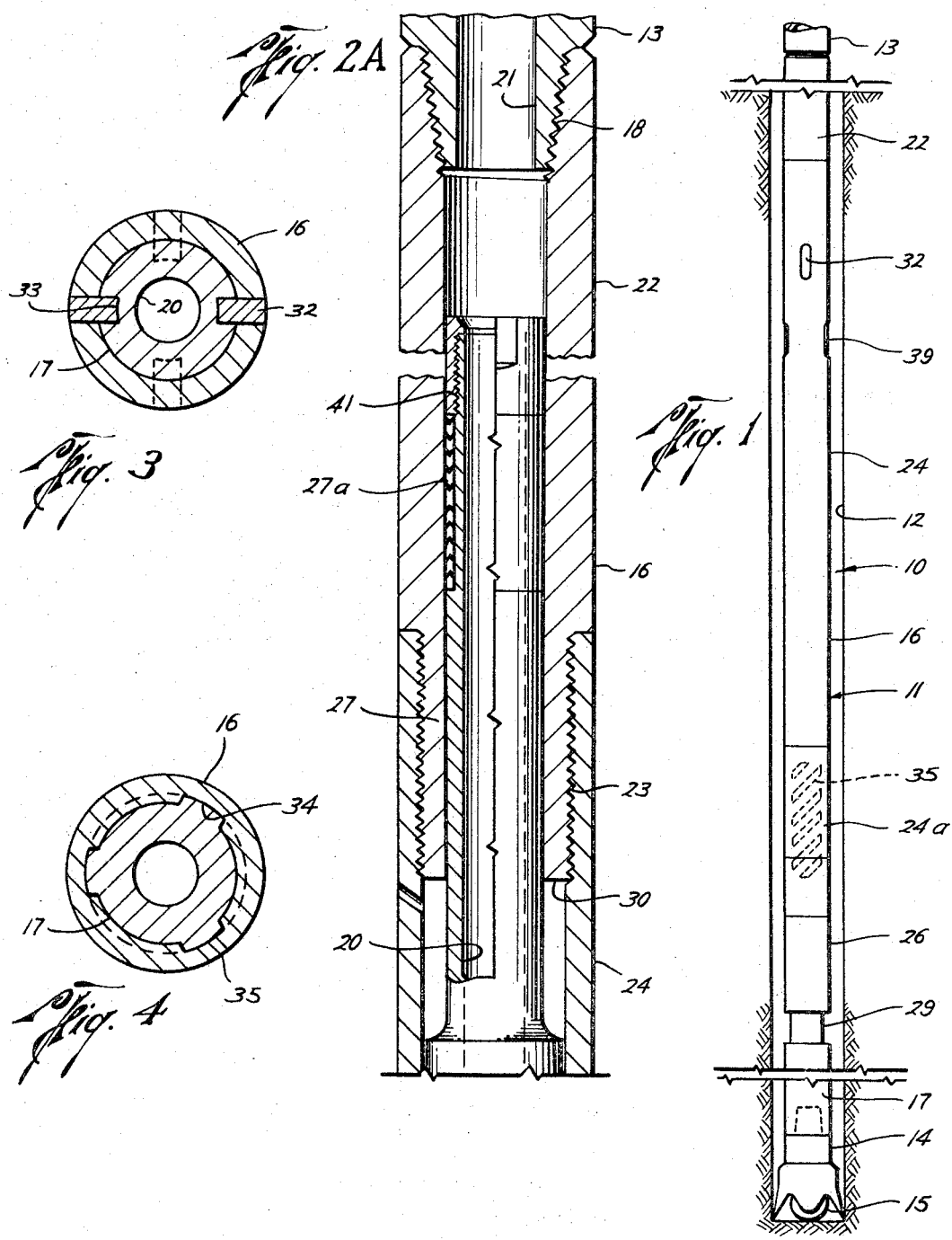
Fred K. Fox
INVENTOR
BY Browning, Simons, Her
& Zickerott
ATTORNEYS Sept. 5, 1967 F. K. FOX 3,339,380
SHOCK ABSORBER
Filed Sept. 16, 1965 4 Sheets-Sheet 2

Fred K. Fox
INVENTOR

BY Browning, Simms, Ayer & Eickenroht
ATTORNEYS

Sept. 5, 1967

F. K. FOX 3,339,380

SHOCK ABSORBER

Filed Sept. 16, 1965

Fred K. Fox
INVENTOR

BY Browning, Simms, Hyer & Eickenroht
ATTORNEYS

Sept. 5, 1967 F. K. FOX 3,339,380
SHOCK ABSORBER
Filed Sept. 16, 1965 4 Sheets-Sheet 4
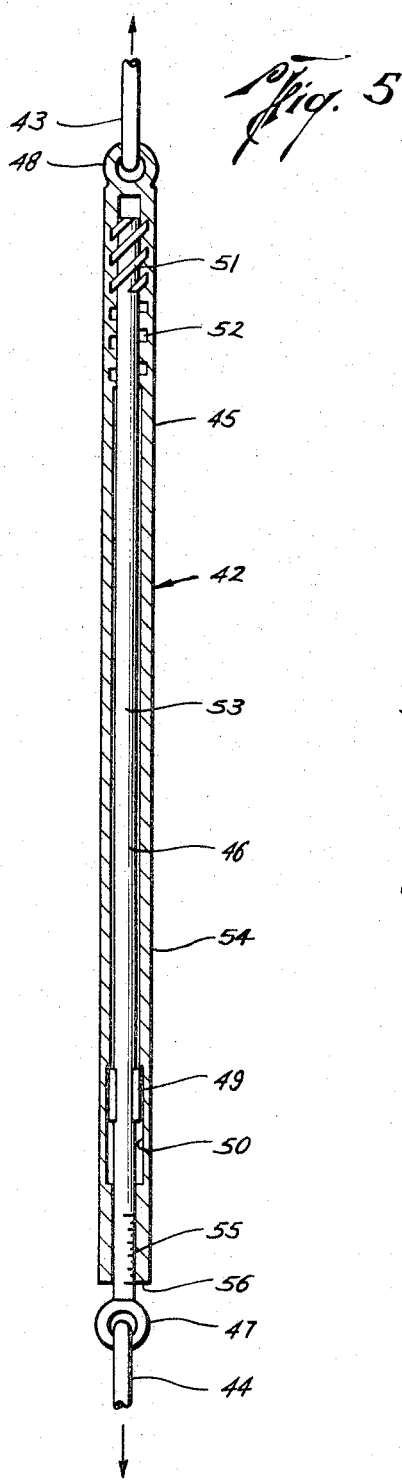
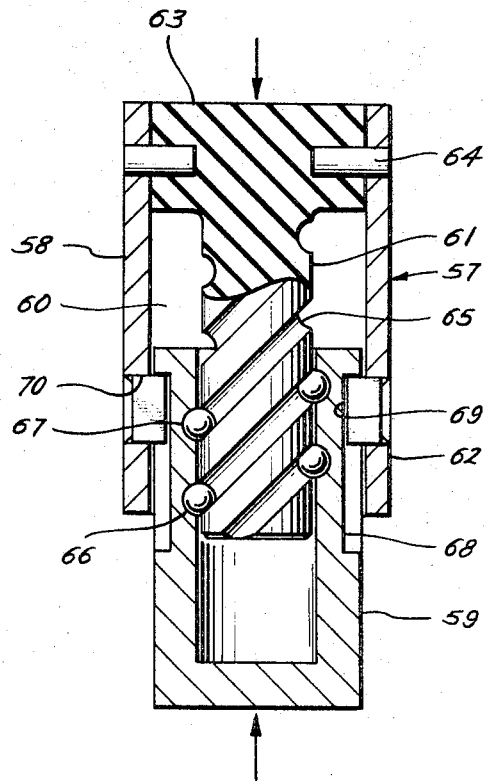
Fred K. Fox
INVENTOR.
BY Browning, Simms, Hyer
& Dickerson
ATTORNEYS

United States Patent Office 3,339,380
Patented Sept. 5, 1967

3,339,380
SHOCK ABSORBER
Fred K. Fox, 242 Stoney Creek Drive,
Houston, Tex. 77024
Filed Sept. 16, 1965, Ser. No. 487,797
12 Claims. (Cl. 64—23)

ABSTRACT OF THE DISCLOSURE

A shock absorbing device comprising a pair of telescopically arranged tubular members each connectible to axially aligned flow conductors. There are splines on one of the members at opposite ends of a section therebetween, and splines on opposite ends of a section of the other member interengageable with those of the one member. The interengageable splines are non-parallel so as to twist at least one of the sections upon relative axial movement between such members.

---

This invention relates to an improved device for absorbing shock, and, more particularly, for absorbing linear shock due to forces either in compression or tension. In one of its aspects, it relates to a device of this type which is especially well suited for absorbing both linear and torsional shock between aligned joints of a flow conductor, such as a rotary drill string.

One of the more serious problems resulting from the shock and vibration encountered in the rotary drilling of oil and gas wells is the wear on the rotating cones of the bit. This same shock and vibration can also be harmful to the drill collars above the bit, particularly the threaded connections between them. Although any long and slender flow conductor will inherently twist to a certain extent to absorb some torsional loading, such twist occurs in the lighter drill pipe which is above the drill collars in a rotary drill string, and, in any case, it provides no cushion for the axial or compressive loads. Consequently, considerable attention has been given to the perfection of a suitable device for absorbing this shock in the drill string.

In one such prior device, a heavy rubber sleeve is vulcanized to relatively movable tubular members forming part of the drill string so as to cushion the torsional as well as the compressive loads in the string. However, the use of this device is limited not only by the fatigue of the rubber, but also by bottom hole temperatures which generally rise as well as drilled deeper and the deleterious affect of chemicals in the mud upon the rubber. Also, of course, when the rubber sleeve is replaced, the device must be taken to the shop where a new sleeve is vulcanized to the tubular members.

In another prior device of this general type, a jet nozzle is disposed within the bore of one of a pair of relatively movable tubular members forming part of the drill string so as to create a differential pressure across the upper end of the one member. Although this provides a downwardly directed force for cushioning compressive loads on the bit and drill string, it is limited to the pressure drop created across the jet nozzle. Furthermore, since less pressure drop is available, the available cushioning force will decrease as the well is drilled deeper. Still further, the use of the jet nozzle within the cushioning device necessarily deprives the bit of a jetting action which would increase its drilling efficiency.

In still another prior device of this type, it has been proposed to absorb shock by means of a coil spring disposed between such relatively movable members. However, in many cases, these devices have been adapted to absorb one or the other, but not both of the torsional and axial shock. Furthermore, the internal diameter of the drill string is not large enough to contain springs capable of absorbing the tremendous loads encountered in the drill string; and, in any case, such springs are subject to breakage and must be protected against corrosion.

It is therefore an object of this invention to provide a shock absorber which obviates the above-noted shortcomings and is therefore especially well suited for use in a rotary drill string.

Another object is to provide a shock absorber which is constructed of a minimum number of parts which do not normally require repair, and which is therefore not only well suited for use in such a drill rotary string, but also in other environments as well.

A more particular object is to provide a shock absorber of the character above described which, when used in a drill string, is not limited by bottom hole well temperature or characteristics of the mud, does not substantially decrease the drilling efficiency of the string, does not depend upon a coil spring, and is just as capable of absorbing shock at one depth within the well as at another.

In the illustrated embodiments of the invention, first and second elongate members are arranged telescopically of one another, and non-parallel splines connect such members on opposite ends of a section of at least one of them. Thus, upon relative axial movement of said members, torque is applied to the section to twist it and the resistance of such section to the twisting absorbs the shock of the force which causes the relative axial movement.

In an environment for which the device is especially well suited, and in accordance with one embodiment of the invention, the elongate members are tubular and connectible with co-axially arranged flow conductors between which the shock is to be absorbed so as to provide continuations thereof. More particularly, as illustrated, the conductors form a part of a rotary drill string, and the splines are arranged to absorb the shock due to compressive loads encountered by the bit in the drilling operation. The first of these members has means on its upper end for connection to one drill string member, and the second tubular member has its upper end arranged telescopically within the first member and means on its lower end for connection to the lower drill string member.

In the interest of neither enlarging the outside diameter nor reducing the inside diameter of the drill string, the splines of this embodiment are disposed on the interior of one member and on the exterior of the other member. Also, the lower splines on the second member nearest the bit at the bottom of the drill string are inclined at a relatively large angle with respect to the axis of such members, so that the device is effective to absorb torsional as well as compressive shock.

In another illustrated embodiment of the invention, and as distinguished from the embodiment above described, the interconnecting splines are arranged to apply torque to the twistable section of one elongate member in response to a tensile force. As in the first-mentioned embodiment, it is contemplated that this device will be used in an environment in which headroom is not a practical limitation, so that the splines are on the inside of one and outside of the other elongate member. Although this embodiment does not form part of a flow conductor, so that its elongate members need not be tubular throughout, it is preferably so constructed as to measure the shock of the tensile force it absorbs.

In still another illustrated embodiment of the invention, the splines of each elongate member are arranged concentrically of one another, so that the telescoping portion of one such member fits within an annular space between inner and outer telescoping portions of the other such members. Thus, with the splines on each member disposed generally opposite one another, the device is of minimum dimension from one end to the other and thus well suited for use in environments in which headroom is a limitation. Toward this same end, at least part of the torque section of the one member is made of a material having a relatively small modulus of rigidity, so that it is twistable a maximum amount per unit of torque applied thereto.

In the drawings, wherein like reference characters are used throughout to designate like parts:

FIG. 1 is an elevational view of a rotary drill string extending downwardly within a well bore and having a shock absorber constructed in accordance with the first-described embodiment of the present invention disposed therein just above the bit;

FIGS. 2A to 2E are longitudinal sectional views of the shock absorber shown in FIG. 1, upon an enlarged scale and progressing successively downwardly from the upper to the lower end thereof;

Figure 2B:
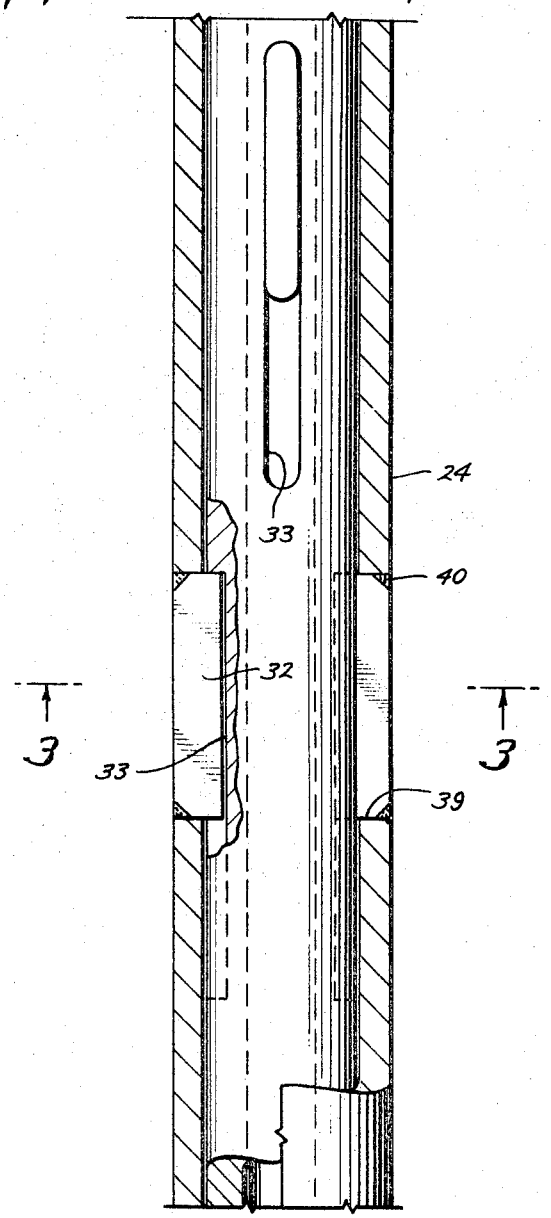
Figure 2C:
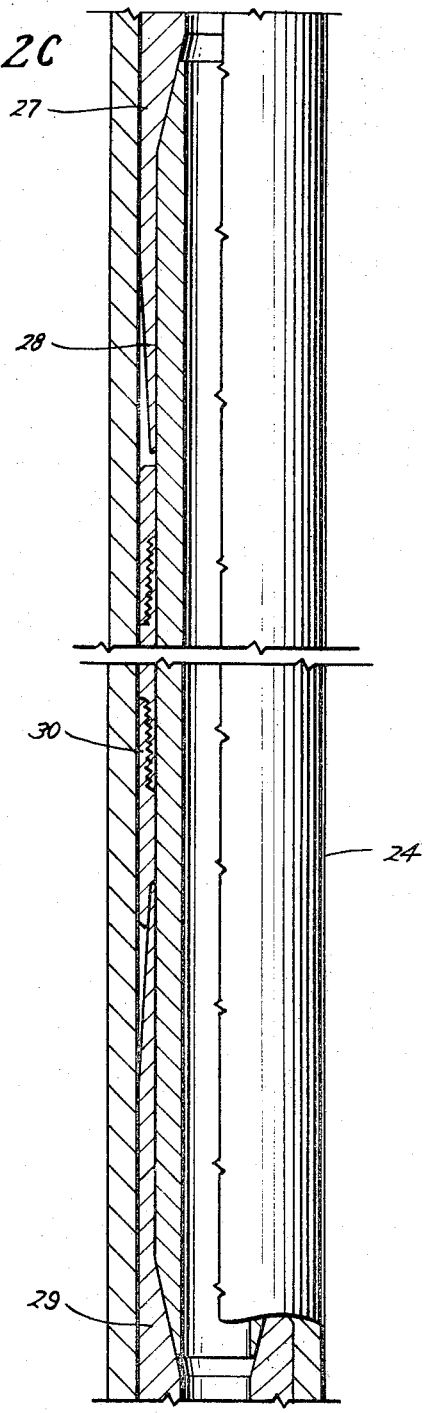
Figure 2D:
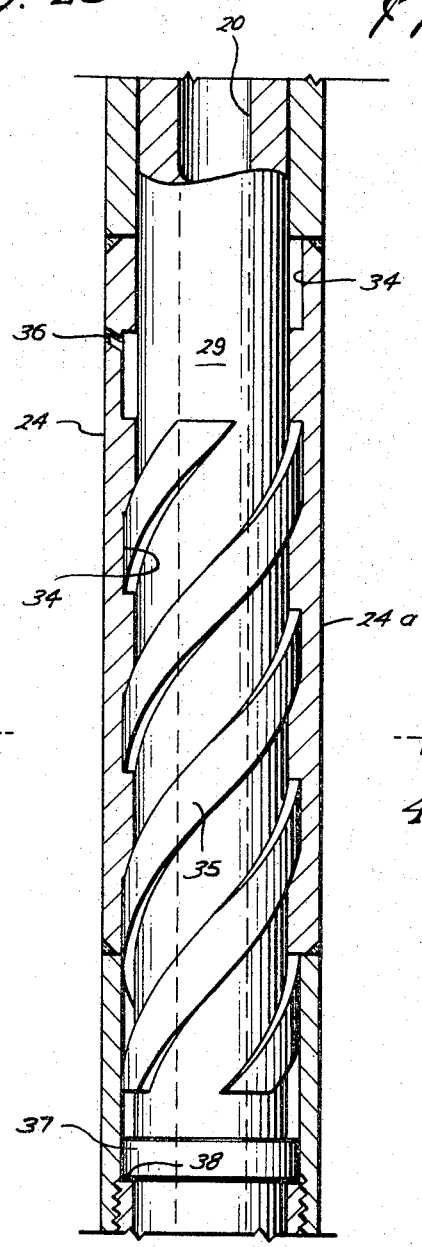

FIGS. 3 and 4 are cross-sectional views of the shock absorber as seen along broken lines 3—3 of FIG. 2B and 4—4 of FIG. 2D, respectively;

FIG. 5 is a longitudinal view, partly in section, of the second described embodiment of the invention; and FIG. 6 is a longitudinal cross-sectional view of the last-described embodiment of the invention.

With reference now to the details of the above-described drawings, the shock absorber 11 illustrated in FIGS. 1 to 4 is shown in FIG. 1 to be connected between the lowermost drill collar 13 and the bit 14 of the drill string 10. As well known in the art, during drilling of the well bore 12, the string is rotated so as to cause the roller cones 15 to grind against the bottom of the well bore, and drilling mud is circulated downwardly through the drill string, out the bit and then upwardly through the annulus between the string and the well bore. The weight of the drill collars forces the bit against the lower end of the bore, and cuttings from the bit are removed from the well with the upwardly flowing drilling mud in the annulus between the drill string and the well bore.

It will be readily understood that hard objects engaged by the bit in the well bore will impart shock to the bit and its bearings, as well as to the tubular members of the string above the bit. These shocks are both compressive and torsional in nature inasmuch as the bit is forced downwardly against the bottom of the well bore as it rotates.

The shock absorber 11 comprises an outer tubular member 16 and an inner tubular member 17 telescopically arranged within the outer tubular member. The upper end of the outer tubular member is connected to the lower end of drill collar 13 by means of the tool joint 18 shown in FIG. 2A. The upper end of the inner tubular member 17 is closely received within the outer tubular member, as shown in FIGS. 2A to 2E, and the lower end thereof is connected to the bit 14 by means of tool joint 19 shown in FIG. 2E. The inner diameter 20 of inner tubular member 17 is substantially the same as the inner diameter 21 of drill collar 13, as well as the inner diameter through a central opening (not shown) in the bit 14, so as to form a relatively smooth continuation of the bore through the lower end of the drill string.

The outer tubular member 16 includes an upper portion 22 whose upper end provides the box end of tool joint 18 and whose lower end is threadedly connected at 23 to the upper end of intermediate portion 24 of the tubular member. As can be seen from FIGS. 2B, 2C, 2D, and 2E, the intermediate portion 24 extends downwardly to a threaded connection 25 with the lower portion 26 of such outer tubular member.

Inner tubular member 17 has an upper portion 27 which carries packing 27a at its upper end for sealably sliding within the inner diameter of upper portion 22 of outer tubular member 16. The lower end of portion 27 is enlarged beneath the lower end of upper portion 22 of tubular member 16 so as to receive the upper end of intermediate portion 28 of the inner tubular member 17. The lower end of the portion 28 is connected to the upper end of lower portion 29 of inner tubular member 17, and the length of portion 28 is maintained concentrically within the intermediate portion 24 of the outer tubular member by means of a spacer 30, as shown in FIG. 2C. The lower portion 29 then extends downwardly through the open lower end of lower portion 26 of outer tubular member 16, and has an enlargement beneath the outer member which provides the box end of the tool joint 19 for connection to bit 14.

Figure 2E:
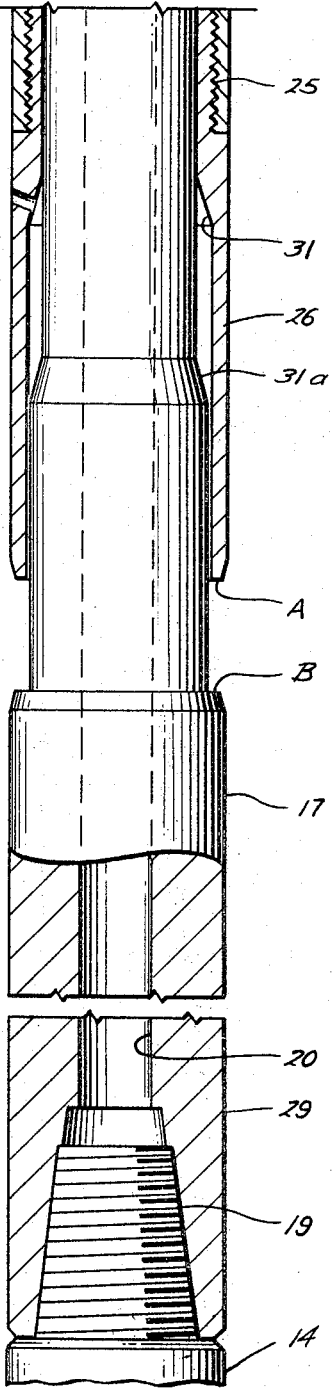

As shown in FIG. 2A, the lower end 30 of upper portion 22 of the outer tubular member is spaced above the enlargement on upper portion 27 of the inner tubular member 17. Similarly, as shown in FIG. 2E, a downwardly facing shoulder 31 on the lower portion 26 of the outer tubular member is spaced above an oppositely facing shoulder 31a on the lower portion 29 of inner tubular member 17. More particularly, each of these distances is greater than the distance between shoulder "A" on the lower end of outer tubular member portion 26 and shoulder "B" on the enlarged part of inner tubular member portion 29. Thus, for reasons which will be apparent from the description to follow, the inner member is free to move upwardly within the outer member a distance which is limited by engagement of shoulder "B" with shoulder "A."

As shown in FIG. 2B as well as in FIG. 3, the intermediate portion 24 of the outer tubular member 16 carries a plurality of inwardly projecting, axially extending lugs 32 which are closely received within axially extending slots 33 formed in the outer periphery of upper portion 27 of the inner tubular member 16 to form interconnecting splines which prevent relative rotation between adjacent portions of the inner and outer tubular members as they move axially relative to one another. In the particular construction shown in FIGS. 2B and 3, there are four such interconnecting splines equally spaced angularly about the axis of each of the tubular members. One pair of diametrically opposed lugs is spaced axially above the other pair of diametrically opposed lugs so as to reduce the stresses in the members at any one cross section along the tubular members.

As shown in FIGS. 2D and 4, the intermediate portion 24 of the outer tubular member has a plurality of parallel helical grooves 34 formed on its inner periphery each closely receiving a helical rib formed on the outer periphery of the adjacent portion 29 of the inner tubular member so as to form interconnecting splines which cause the adjacent portions of the members to be rotated relative to one another during relative axial movement therebetween. More particularly, these helical splines between the inner and outer tubular members are below the axial splines.

With the inner tubular member in its axially extended position relative to the outer tubular member, as shown in the drawings, the lower ends of slots 33 are spaced below the lower ends of the lugs 32 and the ribs 35 are free to move upwardly within the grooves 34. During upward movement of the inner tubular member relative to the outer tubular member, they are held against rotation by the upper set of splines while being caused to rotate by the lower splines. This, of course, imparts torque to the sections of the inner and outer tubular members between the upper and lower sets of splines so as to twist them to an extent proportional to the relative axial movement of such members. As previously described, the resistance of such members to the resulting flexure or twisting provides the shock absorbing force.

The amount which each such tubular member will twist when subjected to a given torque load depends, at least in part, upon its polar moment of inertia. Thus, with the members of the same material and at least substantially the same thickness, the greater amount of shock will be absorbed by the inner tubular member.

The flexure of each member also depends on the material of which it is made. With this in mind, and particularly in view of the fact that a great proportion of the flexure will occur in the inner tubular member, the intermediate portion 28 thereof which forms substantially the entire torque section of the inner tubular member is preferably made of a special metal which is highly resistant to corrosion and has a low modulus of elasticity, so that it will flex a greater amount per unit of load than other common metals. In the interest of reducing stresses to a minimum, and as shown in the drawings, the opposite ends of the portion 28 are connected to the other portions of the inner tubular member by a sweat fit.

Although the only requirement for the two sets of interconnecting splines is that they be non-parallel, the arrangement illustrated, wherein the upper splines are axial and the lower splines are helical, is preferred for a number of reasons insofar as this embodiment is concerned. For one thing, the disposition of one set of splines axially of such members facilitates manufacture and, as will be understood from the description to follow, also facilitates assembly of the device. Obviously, however, in the interest of obtaining as much flexure as possible for each unit of axial movement between the tubular members, both sets of splines may be disposed helically, with each extending at an opposite angle with respect to the other relative to the axis of the tubular members.

Also, particularly in the case of a drill string shock absorber which absorbs torsional as well as axial loads, it is preferred that at least the lower set of splines be helical. In this manner, the device is able to absorb torsional shock by means of the flexure within the torque section of the tubular member.

As shown in FIG. 2D, each of the helical grooves 34 if formed in a separate tube 24a welded into the intermediate portion 24 of the outer tubular member. This facilitates forming of the grooves on the inner periphery of the tubular member. As also shown in FIG. 2D, there is a port 36 through the tubular member connecting a space therein above the helical ribs 35 with the exterior of the device.

There is a collar 37 on the portion 29 of the inner tubular member beneath the lower ends of the ribs 35 so as to form a downwardly facing shoulder which, as shown and in the absence of shock to be absorbed, rests upon an upwardly facing shoulder 38 on the upper end of lower portion 26 of the outer tubular member. Thus, in the event the torque section of the inner tubular member should break intermediate the two sets of splines, the lower end of the broken inner member will be prevented from falling through the open lower end of outer tubular member. At the same time, the upper end of the collar 37 is spaced beneath the lower end of tube 24a a sufficient distance to prevent it from interfering with the upward movement of the inner tubular member relative to the outer tubular member as the device absorbs shock.

Each lug 32 is received through an opening 39 in the outer tubular member and then welded in place, as shown at 40. Thus, in the assembly of the device, the lower portion 26 of the outer tubular member 16 is removed so as to permit the helical lugs 35 to be moved through the lower end of intermediate portion 24 and rotated into the grooves 34. At the same time, with the lugs 32 still to be assembled, the upper portion 27 of the inner tubular member including the slots 33 moves freely into the upper portion 24 of the outer tubular member, as shown in FIG. 2B. When the helical lugs 35 are received within grooves 34 to the extent illustrated, the slots 33 will be disposed opposite their respective openings 39 in the outer tubular member. At this time, the lugs 32 may be moved into place within the slots 33 and then welded to the outer tubular member.

As will be understood from FIG. 2A, the upper portion 22 of the outer tubular member 16 may be removed so as to provide access to the packing 28 on the upper end of upper portion 27 of the inner tubular member. In this way, such packing may be replaced or repaired upon removal of gland nut 41, and the upper portion 22 of the outer tubular member then reconnected.

The shock absorber 42 shown in FIG. 5 is connected between a pair of co-axially extending rods 43 and 44 which, as indicated by the arrows in FIG. 5, are adapted to be pulled in opposite directions. Thus, as previously mentioned, this embodiment of the invention is adapted to absorb shock due to a tensile force. The need for such a device may occur in many environments, such as, for example in the case of a suspended load. More particularly, and as will be described to follow, the device 42 is adapted to measure as well as absorb the shock of this load.

As in the case of the shock absorber 11, the shock absorber 42 includes an outer elongate member 45 and an inner elongate member 46 telescopically received within the outer member. In this embodiment, however, the inner elongate member is solid rather than tubular, because the device is not intended to form a part of a flow conductor. Thus, the member 46 merely comprises a cylindrical rod having an eye 47 at its lower end for connection with rod 44. As shown in FIG. 5, the upper end of inner member 45 also has an eye 48 for connection to the rod 43. Obviously, other means may be provided for connecting the elongate members to the parts 43 and 44, although the eyes enable some universality of movement, which permits rotation of the members relative to one another during absorption of shock.

As previously described, in its illustrated environment, the shock absorber 42 is not limited in a longitudinal direction. Thus, the splines are formed on the inner diameter of the outer member and outer diameter of the inner member. More particularly, there are axially extending lugs 49 on the inner member 46 for fitting closely within axially extending grooves 50 on the outer member 45, thereby constraining adjacent portions of the members for axial movement with one another. Similarly, there are helical lugs 51 on the opposite end of the inner member 46 fitting closely within helical grooves 52 on the inside of the outer member 45, thereby constraining adjacent portions of such members for rotation relative to one another during relative axial movement. As a result, upon relative axial movement between the two members, a section 53 of the inner member and a section 54 of the outer member intermediate the spaced splines are twisted by the torque imparted thereto.

As distinguished from the first described embodiment of the invention, however, the interconnecting helical splines of the inner and outer members of the shock absorber may be disposed above the axial splines, because there is actually no rotational shock to be absorbed. That is, the flexure of the sections 53 and 54 is merely incidental to the over-all purpose of the device in absorbing shock due to the tensile load.

Since this device absorbs tensile shock, the male splines 49 and 51 on the inner member are disposed within the upper ends of the female splines 50 and 52 in the outer elongate member when the device is at rest—i.e., before subjected to the shock of the load which is to be absorbed. Thus, as such load is absorbed, as by a downward pull on rod 44, the inner member is free to move downwardly relative to the outer member so as to twist the torque sections 53 and 54.

As shown in FIG. 5 there are appropriate indicia 55 extending longitudinally along the lower outer diameter of the inner member 46. More particularly, these indicia are arranged to cooperate with the lower end 56 of the outer member 45 as the inner member moves downwardly relative to the outer member. In this way, the indicia may be calibrated so as to measure the tensile force between rods 43 and 44.

The illustration of the device 42 is obviously diagrammatic, and it therefore does not show the detailed construction of the inner and outer members which permit their assembly as well as their disassembly. However, a suitable construction for this purpose will be obvious to one skilled in the art, particularly in view of the foregoing detailed description of the shock absorber 11.

As previously described, the shock absorber 57 illustrated in FIG. 6 is adapted to absorb shock due to a compressive load as indicated by the arrows adjacent the ends of the outer and inner, telescopically arranged elongate members 58 and 59, respectively, of such device. In this respect, of course, the shock absorber 57 is similar to the shock absorber 11 illustrated in FIGS. 1 to 4. On the other hand, it is similar to the shock absorber 42 described in connection with FIG. 5 in that its members 58 and 59 are not tubular throughout and thus are not adapted to form a continuation of a fluid conductor.

The shock absorber 57 differs from both the shock absorber 11 and 42 in that it is particularly adapted for use in environments wherein headroom is limited. Thus, and as previously mentioned, the upper end of inner member 59 extends within an annular space 60 between a concentrically arranged stem 61 and sleeve 62 of the outer member 58. As shown in FIG. 6, the stem and sleeve are connected by head 63 which closes the upper end of the member 58. The stem and sleeve terminate at their lower ends at substantially the same level. The head 63 is integral with the stem 61 and secured to the sleeve 62 by pins 64.

The outer diameter of stem 61 and inner diameter of inner member 59 are provided with oppositely facing helical grooves 65 and 66, respectively, which closely receive chains of balls 67 therebetween. These balls are held in place within the grooves by suitable stops (not shown) mounted in grooves 66 at opposite ends of each chain. Thus, although these balls are not integral with either the inner or outer member, each chain in effect forms a male spline on the inner member 59 for fitting with a female spline formed by a groove 65 in the stem of the outer member.

The outside of member 59 is provided with axially extending grooves 68 each to receive an axially extending lug 69 carried by the sleeve 62 of outer member 58. Thus, as shown in FIG. 6, these lugs are inserted through openings 70 in sleeve portions 62 and then secured in place, as by welding.

In this shock absorber 57, the torque will be imparted to the torque section of the outer member 58 between splines 69 on one end and splines 65 on the other end. That is, with the splines 68 and 67 disposed on opposite side of the inner and outer diameter of inner member 59, the latter is effectively held against twisting during its upward movement relative to member 58. On the other hand, while the lower end of sleeve 62 is held against rotation relative to the member 59, the lower end of the stem 58 is caused to rotate relative thereto as the members 58 and 59 move axially in the directions indicated by the arrows.

In the embodiment shown, and as previously described, stem 61 and the head 63 are formed of a relatively soft and flexible material, such as rubber. This further contributes to a device requiring a minimum of headroom inasmuch as the rubber will twist just that much more per unit of load than will a more rigid material, such as metal.

As illustrated, the ends of the members 58 and 59 opposite their telescopic portions do not have means or parts for connecting them between those parts adapted to exert a compressive force axially of the shock absorber. Thus, the illustrated form of the device is well suited for merely sliding between oppositely facing surfaces of such parts. On the other hand, of course, this device may be provided with suitable connecting parts, as in the case of the shock absorbers 11 and 42.

From the foregoing it will be seen that this invention is one well adapted to attain all of the ends and objects hereinabove set forth, together with other advantages which are obvious and which are inherent to the process and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A shock absorber, comprising a pair of elongate members arranged telescopically of one another, and non-parallel splines connecting said members at opposite ends of a section of at least one of said members so as to twist said section upon relative axial movement between said members.

2. A shock absorber of the character defined in claim 1, wherein the splines are disposed on the inside of one member and outside of the other member.

3. A shock absorber of the character defined in claim 1, wherein the splines are disposed on concentric portions of each of said members.

4. A device for absorbing axial shock between two parts, comprising first and second telescopically arranged members disposable between said parts, a first set of splines connecting the members to one another to constrain adjacent portions thereof for movement in one direction relative to one another upon relative axial movement between said members, and a second set of splines connecting said members to one another to constrain adjacent portions thereof for movement in another direction relative to one another upon relative axial movement between said members, whereby a section of at least one of said members intermediate the first and second set of splines is twisted in response to such relative axial movement.

5. A device of the character defined in claim 4, wherein each member has means thereon for connection to one of said parts.

6. A device of the character defined in claim 4, including means on said members for indicating the force of the shock to be absorbed.

7. A device for absorbing shock between axially aligned flow conductors, comprising a pair of telescopically arranged tubular members each having means thereon for connection to one of the flow conductors, splines on one of said members at opposite ends of a section therebetween, and splines on opposite ends of a section of the other member interengageable with those on said one member, said interengageable splines being non-parallel so as to twist at least one of said sections upon relative axial movement between said members.

8. A device for absorbing shock between rotary drill string members, comprising a first tubular member having means on its upper end for connection to one drill string member, and a second tubular member having its upper end arranged telescopically within the first tubular member and means on its lower end for connection to the other drill string member, and axially spaced apart upper and lower splines on the exterior of the second tubular member interengageable with axially spaced apart upper and lower splines on the interior of the first tubular member, respectively, the upper and lower interengageable splines being non-parallel so as to twist a section of at least one of said tubular members intermediate the upper and lower splines upon relative axial movement between said tubular members.

9. A device of the character defined in claim 8, wherein the lower splines form a relatively large angle with the axis of said tubular members.

10. A device of the character defined in claim 8, including shoulders on said tubular members abutable with one another beneath the lower splines to limit movement of said second member relative to the first.

11. A device of the character defined in claim 8, including means sealing between said tubular members above the upper splines.

12. A device of the character defined in claim 8, wherein the splines of the first tubular member comprise radially inwardly projecting parts extenable through openings in the first member into grooves forming splines on the second tubular member.

References Cited
UNITED STATES PATENTS

| | | | |
|---|---|---|---|
| 839,803 | 1/1907 | Amsler | 64—15 |
| 976,232 | 11/1910 | Tyson | 64—27 |
| 1,318,225 | 10/1919 | Nippert | 175—322 |
| 1,464,220 | 8/1923 | Sachs et al. | 64—27 X |
| 1,785,086 | 12/1930 | Hauk | 175—322 X |
| 2,010,489 | 8/1935 | Ice | 64—27 |
| 2,429,067 | 10/1947 | McDonald | 74—440 |
| 3,118,660 | 1/1964 | Saniewski | 267—1 X |
| 3,161,420 | 12/1964 | Rix | 267—57 X |

FRED C. MATTERN, Jr., *Primary Examiner.*

H. C. COE, *Assistant Examiner.*